United States Patent
Sawayama

(10) Patent No.: US 8,924,063 B2
(45) Date of Patent: Dec. 30, 2014

(54) VEHICLE, CONTROL METHOD, AND COMPUTER PROGRAM

(75) Inventor: Akira Sawayama, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/876,513

(22) PCT Filed: Oct. 20, 2011

(86) PCT No.: PCT/JP2011/074187
§ 371 (c)(1),
(2), (4) Date: Mar. 28, 2013

(87) PCT Pub. No.: WO2012/053607
PCT Pub. Date: Apr. 26, 2012

(65) Prior Publication Data
US 2013/0184923 A1 Jul. 18, 2013

(30) Foreign Application Priority Data
Oct. 22, 2010 (JP) ................................. 2010-237799

(51) Int. Cl.
*B60W 20/00* (2006.01)
*B60L 11/14* (2006.01)
(Continued)

(52) U.S. Cl.
CPC .............. *B60W 20/108* (2013.01); *B60L 11/14* (2013.01); *B60W 10/02* (2013.01);
(Continued)

(58) Field of Classification Search
CPC .. B60W 10/06; B60W 10/08; Y02T 10/6286; Y02T 10/7077
USPC ............................................. 701/22; 477/70
See application file for complete search history.

(56) References Cited

U.S. PATENT DOCUMENTS

2005/0143877 A1* 6/2005 Cikanek et al. ................. 701/22
2011/0165992 A1* 7/2011 Ueno et al. ........................ 477/9

FOREIGN PATENT DOCUMENTS

JP 2009-234566 A 10/2009

OTHER PUBLICATIONS

The International Search Report of the corresponding International Application, PCT/JP2011/074187 dated Jan. 10, 2012.

*Primary Examiner* — Mary Cheung
*Assistant Examiner* — Yuen Wong
(74) *Attorney, Agent, or Firm* — Cowan, Liebowitz & Latman, P.C.; Mark Montague

(57) ABSTRACT

The present invention aims to enhance fuel economy without imparting a sense of discomfort to a driver who drives a vehicle. A determination unit determines whether a depression amount of an accelerator pedal is equal to or lower than a first threshold value set beforehand, when a clutch is disengaged and electric power is regenerated. A clutch control unit controls the engagement or the disengagement of the clutch in such a manner as keeping the disengagement of the clutch, when the depression amount of the accelerator pedal is determined to be equal to or lower than the first threshold value, and engaging the clutch when the depression amount of the accelerator pedal is determined to exceed the first threshold value. The present invention can be applied to a hybrid vehicle.

5 Claims, 5 Drawing Sheets

(51) Int. Cl.

| | | |
|---|---|---|
| *B60W 10/02* | (2006.01) | |
| *B60W 10/06* | (2006.01) | |
| *B60W 10/08* | (2006.01) | |
| *B60W 30/18* | (2012.01) | |
| *B60K 6/48* | (2007.10) | |
| *B60L 7/14* | (2006.01) | |
| *B60L 15/20* | (2006.01) | |

(52) U.S. Cl.
CPC ............... *B60W 10/06* (2013.01); *B60W 10/08* (2013.01); *B60W 20/00* (2013.01); *B60W 30/18127* (2013.01); *B60K 6/48* (2013.01); *B60L 7/14* (2013.01); *B60L 15/20* (2013.01); *B60L 15/2009* (2013.01); *B60W 2030/1809* (2013.01); *B60W 2540/103* (2013.01); *B60W 2710/021* (2013.01); *Y02T 10/6286* (2013.01); *Y10S 903/93* (2013.01); *Y10S 903/946* (2013.01); *Y02T 10/7077* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/545* (2013.01); *B60L 2240/547* (2013.01); *B60L 2240/549* (2013.01); *B60L 2250/28* (2013.01); *B60L 2270/145* (2013.01); *Y02T 10/6221* (2013.01); *Y02T 10/7241* (2013.01); *Y02T 10/642* (2013.01)
USPC ............... 701/22; 477/70; 903/930; 903/946

VEHICLE, CONTROL METHOD, AND COMPUTER PROGRAM

CROSS REFERENCE TO RELATED APPLICATIONS

This is a U.S. national stage of application No. PCT/JP2011/074187, filed on Oct. 20, 2011. Priority under 35 U.S.C.§119(a) and 35 U.S.C.§365(b) is claimed from Japanese Patent Application No. 2010-237799, filed on Oct. 22, 2010, the disclosure of which are also incorporated herein by reference.

TECHNICAL FIELD

The present invention relates to a vehicle, a control method, and a computer program.

BACKGROUND ART

A so-called hybrid vehicle that is driven by an internal combustion engine and an electric motor has been focused. In the hybrid vehicle, the electric motor functions as a generator to regenerate electric power (hereinafter merely referred to as regenerate power), and store the electric power during deceleration. The stored electric power is utilized to generate driving force for accelerating the vehicle or driving the vehicle.

Some hybrid vehicles have an automatic transmission. The automatic transmission is also referred to as a transmission below.

In this case, a clutch that transmits power or cuts the transmission of power can be provided between the internal combustion engine and the electric motor.

When a driver drives a vehicle on a long downgrade, the driver disengages the clutch to execute regeneration, and brake is applied by torque (hereinafter referred to as regeneration torque) generated by the regeneration of the electric motor.

When an accelerator pedal is slightly operated during the regeneration with the clutch being disengaged in the hybrid vehicle, the clutch is engaged for acceleration. During the engagement of the clutch, the rotational speed of the engine slightly increases from the speed in the idling state, and with this state, the clutch is engaged, in order not to apply shock to the vehicle.

There has conventionally been proposed a parallel hybrid vehicle including a battery temperature sensor that detects a state of a battery, an HVECU, a vehicle speed sensor that detects a state of the vehicle, an engine rotational speed sensor, an accelerator pedal opening degree sensor, and an FI/AT/MGECU that changes required values of an engine and a motor based on the accelerator pedal opening degree, and that determines whether a fuel supply to the engine is stopped based on the condition of the vehicle, wherein a fuel-cut state is kept when the vehicle is reducing speed, and the accelerator pedal opening degree is equal to or smaller than a predetermined opening degree, and until the accelerator pedal reaches the predetermined opening degree, a target torque obtained based on the accelerator pedal opening degree is controlled by the MOTECU (see, for example, patent literature PTL1).

CITATION LIST

Patent Literature

PTL1: JP 2005-291206 A

SUMMARY OF INVENTION

Technical Problem

However, when the driver operates the accelerator pedal, if only a little, since he/she intends to slightly increase the speed during the regeneration, the clutch might be engaged. With this, the clutch might frequently be engaged and disengaged, whereby the engine cannot keep the idling stand-by state, which deteriorates fuel economy.

For example, even when the driver intends to slightly increase the speed during when the driver drives the vehicle on a gentle downward slope with the clutch being disengaged for regeneration, the clutch might be engaged each time. When the clutch is engaged, friction of the engine is transmitted to a wheel, so that braking force increases (engine braking is applied). Therefore, at the moment when the clutch is engaged, braking force discontinuously increases, so that the speed of the vehicle abruptly decreases. This might give the driver a sense of discomfort.

Specifically, when the driver depresses the accelerator pedal even a little with the clutch being disengaged during the regeneration, the regeneration is canceled, and the clutch is engaged. Therefore, the clutch might frequently be engaged and disengaged, which deteriorates drivability and fuel economy.

The present invention aims to solve the above-mentioned problem, in other words, the present invention aims to provide a vehicle, a control method, and a computer program that can enhance fuel economy without imparting a sense of discomfort to a driver who drives a vehicle.

Solution to Problem

In order to solve the above-mentioned problem, one aspect of the present invention is a vehicle that is driven by an internal combustion engine and an electric motor, a shaft of the internal combustion engine and a shaft of the electric motor for transmitting power being connected by a clutch that transmits power or cuts the transmission of power, and that regenerates electric power by the electric motor when reducing its speed, the vehicle includes a device comprising:

a determination unit that determines whether a depression amount of an accelerator pedal is equal to or lower than a first threshold value set beforehand, when the clutch is disengaged to regenerate electric power; and a first control unit that controls the engagement or the disengagement of the clutch in such a manner as keeping the disengagement of the clutch, when the depression amount of the accelerator pedal is determined to be equal to or lower than the first threshold value, and engaging the clutch when the depression amount of the accelerator pedal is determined to exceed the first threshold value.

According to one aspect of the present invention, in the vehicle described above, the determination unit determines whether the depression amount of the accelerator pedal is equal to or lower than the first threshold value indicating the depression amount that requests 0 acceleration.

According to one aspect of the present invention, the vehicle described above further includes a second control unit that controls torque generated by regeneration of electric power by the electric motor, wherein the determination unit determines whether the torque is equal to or lower than a second threshold value set beforehand, and the first control unit controls the engagement or the disengagement of the clutch in such a manner as keeping the disengagement of the clutch, when the depression amount of the accelerator pedal is determined to be equal to or lower than the first threshold value, and the torque is determined to be equal to or lower than the second threshold value, and to engage the clutch when the depression amount of the accelerator pedal is determined to exceed the first threshold value, or the torque is determined to exceed the second threshold value.

One aspect of the present invention is a control method for a vehicle that is driven by an internal combustion engine and an electric motor, a shaft of the internal combustion engine and a shaft of the electric motor for transmitting power being connected by a clutch that transmits power or cuts the transmission of power, and that regenerates electric power by the electric motor when reducing its speed, the method comprising: a determining step of determining whether a depression amount of an accelerator pedal is equal to or lower than a threshold value set beforehand, when the clutch is disengaged to regenerate electric power; and a control step of controlling the engagement or the disengagement of the clutch in such a manner as keeping the disengagement of the clutch, when the depression amount of the accelerator pedal is determined to be equal to or lower than the threshold value, and engaging the clutch when the depression amount of the accelerator pedal is determined to exceed the threshold value.

One aspect of the present invention is a computer program that executes a vehicle, which is driven by an internal combustion engine and an electric motor, a shaft of the internal combustion engine and a shaft of the electric motor for transmitting power being connected by a clutch that transmits power or cuts the transmission of power, and that regenerates electric power by the electric motor when reducing its speed, to execute: a determining step of determining whether a depression amount of an accelerator pedal is equal to or lower than a threshold value set beforehand, when the clutch is disengaged to regenerate electric power; and a control step of controlling the engagement or the disengagement of the clutch in such a manner as keeping the disengagement of the clutch, when the depression amount of the accelerator pedal is determined to be equal to or lower than the threshold value, and engaging the clutch when the depression amount of the accelerator pedal is determined to exceed the threshold value.

Advantageous Effects of Invention

The present invention according to one aspect can provide a vehicle, a control method, and a computer program that can enhance fuel economy without imparting a sense of discomfort to a driver who drives a vehicle.

DESCRIPTION OF EMBODIMENTS

A hybrid vehicle according to a first embodiment of the present invention will be described below with reference to FIGS. 1 to 5.

Figure 1:
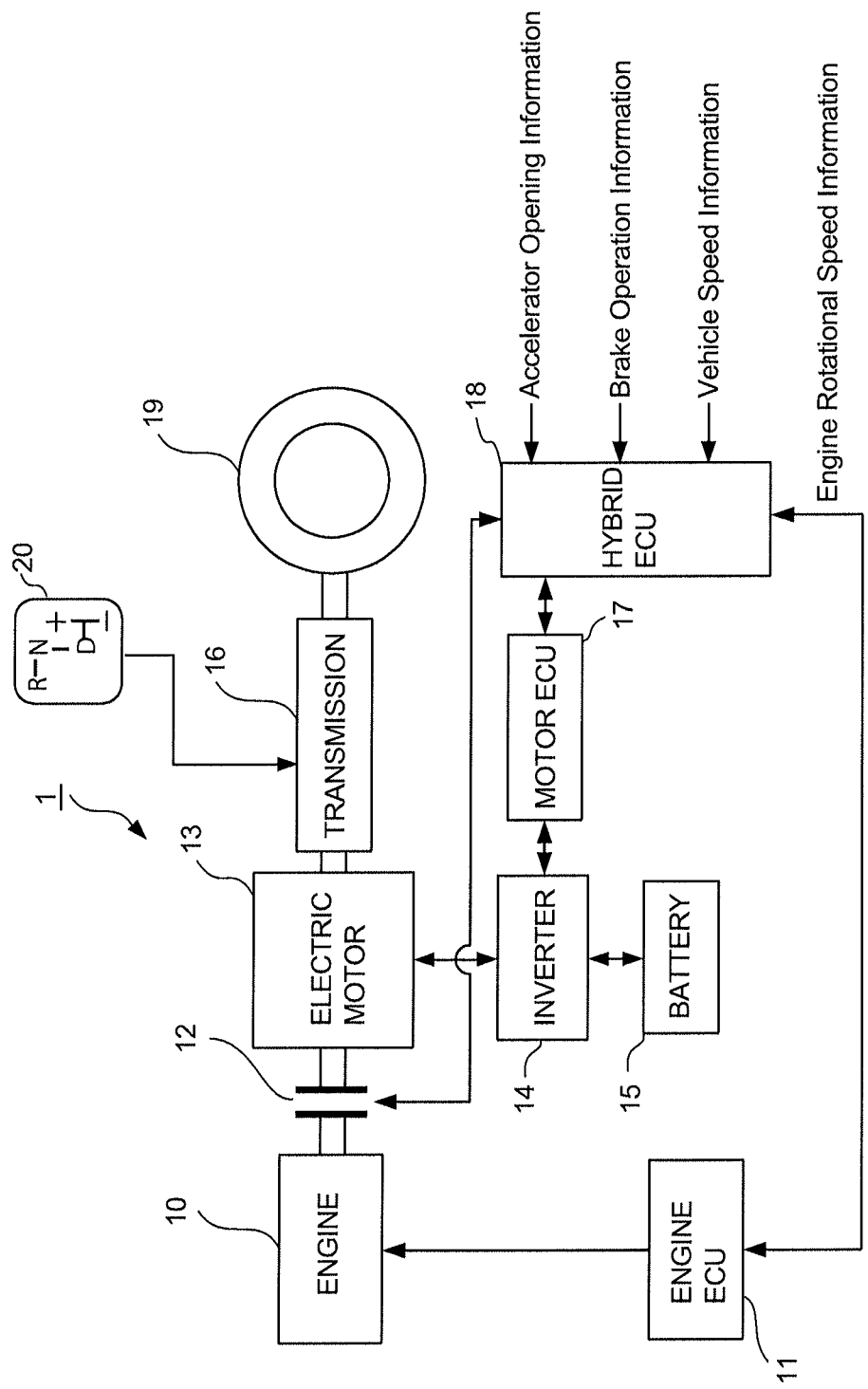
FIG. 1 is a block diagram illustrating an example of a configuration of a hybrid vehicle 1.

FIG. 1 is a block diagram illustrating an example of a configuration of a hybrid vehicle 1. The hybrid vehicle 1 is one example of vehicles. The hybrid vehicle 1 is driven by an internal combustion engine and/or an electric motor via an automatic transmission, and when the hybrid vehicle 1 reduces its speed, electric power can be regenerated by the electric motor. The automatic transmission is referred to as a semiautomatic transmission. It has a configuration same as a manual transmission, but can realize an automatic shift operation.

The hybrid vehicle 1 includes an engine 10, an engine ECU (Electronic Control Unit) 11, a clutch 12, an electric motor 13, an inverter 14, a battery 15, a transmission 16, a motor ECU 17, a hybrid ECU 18, a wheel 19, and a shift unit 20. The transmission 16 has the above-mentioned semiautomatic transmission, and is operated by the shift unit 20 having a drive range (hereinafter referred to as D (Drive) range).

The engine 10 is one example of the internal combustion engine. It is controlled by the engine ECU 11 to burn gasoline, light gas oil, CNG (Compressed Natural Gas), LPG (Liquefied Petroleum Gas), or alternate fuel therein, thereby generating power for rotating a shaft. It then transmits the generated power to the clutch 12.

The engine ECU 11 is a computer that works in conjunction with the motor ECU 17 in accordance with an instruction from the hybrid ECU 18. It controls the engine 10, i.e., controls the fuel injection amount or valve timing. For example, the engine ECU 11 is composed of a CPU (Central Processing Unit), ASIC (Application Specific Integrated Circuit), microprocessor (microcomputer), and DSP (Digital Signal Processor), and includes an operation unit, a memory, and an I/O (Input/Output) port.

The clutch 12 is controlled by the hybrid ECU 18, and transmits a shaft output from the engine 10 to the wheel 19 via the electric motor 13 and the transmission 16. Specifically, the clutch 12 mechanically connects (hereinafter merely referred to as connection) the rotation shaft of the engine 10 and the rotation shaft of the electric motor 13 to transmit the shaft output of the engine 10 to the electric motor 13, or cuts the mechanical connection between the rotation shaft of the engine 10 and the rotation shaft of the electric motor 13 (hereinafter merely referred to as cut) to allow the rotation shaft of the engine 10 and the rotation shaft of the electric motor 13 to rotate with a different rotational speed, under the control of the hybrid ECU 18.

For example, the clutch 12 mechanically connects the rotation shaft of the engine 10 and the rotation shaft of the electric motor 13, when the hybrid vehicle 1 runs by the power from the engine 10, by which the electric motor 13 generates electric power; when the engine 10 is assisted by the driving force of the electric motor 13; and when the engine 10 is started by the electric motor 13.

For example, the clutch 12 cuts the mechanical connection between the rotation shaft of the engine 10 and the rotation shaft of the electric motor 13, when the engine 10 is stopped or in an idling condition, and the hybrid vehicle 1 runs with the driving force of the electric motor 13, or when the engine 10 is stopped or in an idling condition, the hybrid vehicle 1 reduces its speed, or runs on a downhill, and the electric motor 13 generates electric power (regenerates electric power).

The clutch 12 is different from a clutch that is operated by the driver's operation on a clutch pedal, and it is operated by the control of the hybrid ECU 18.

The electric motor 13 is a so-called motor generator, and it generates power for rotating a shaft by electric power supplied from the inverter 14, and supplies the shaft output to the transmission 16. Alternatively, the electric motor 13 generates electric power by the power for rotating the shaft supplied from the transmission 16, and supplies the electric power to the inverter 14. When the hybrid vehicle 1 increases its speed, or runs with a constant speed, the electric motor 13 generates power for rotating the shaft, and supplies the shaft output to the transmission 16, thereby allowing the hybrid vehicle 1 to run in cooperation with the engine 10. For example, when the hybrid vehicle 1 runs without using power, such as in the case where the electric motor 13 is driven by the engine 10, or in the case where the hybrid vehicle 1 reduces its speed or runs on a downhill, the electric motor 13 operates as a motor generator. In this case, the electric motor 13 generates electric power by the power for rotating the shaft supplied from the transmission 16, and supplies the electric power to the inverter 14, whereby the battery 15 is charged.

The inverter 14 is controlled by the motor ECU 17, and it converts DC voltage from the battery 15 into AC voltage, or converts AC voltage from the electric motor 13 to DC voltage. When the electric motor 13 generates power, the inverter 14 converts the DC voltage from the battery 15 into AC voltage in order to supply the electric power to the electric motor 13. When the electric motor 13 generates electric power, the inverter 14 converts the AC voltage from the electric motor 13 into DC voltage. Specifically, in this case, the inverter 14 functions as a rectifier or a voltage regulation device for feeding DC voltage to the battery 15.

The battery 15 is a chargeable secondary battery. It feeds electric power to the electric motor 13 through the inverter 14 when the electric motor 13 generates power, or it is charged by the electric power generated from the electric motor 13 when the electric motor 13 generates electric power.

The transmission 16 has a semiautomatic transmission (not illustrated) for selecting any one of plural gear ratios (transmission gear ratios) in accordance with a shift instruction signal from the hybrid ECU 18. It changes the transmission gear ratio, and transmits the shifted power of the engine 10 and/or the shifted power of the electric motor 13 to the wheel 19. When the vehicle reduces its speed, or runs on the downhill, the transmission 16 transmits power from the wheel 19 to the electric motor 13. The transmission 16 changes gear to bring the vehicle 1 into a driving state in which power is transmitted, into a so-called neutral state in which the transmission of power is cut, or into a reverse state, by the driver's operation on the shift unit 20 for selecting a drive range (D range), a neutral range, or a reverse range. In the semiautomatic transmission, the driver can manually change the gear position to an arbitrary gear number by operating the shift unit 20.

The motor ECU 17 is a computer that works in conjunction with the engine ECU 11 in accordance with an instruction from the hybrid ECU 18. It controls the electric motor 13 by controlling the inverter 14. For example, the motor ECU 17 is composed of a CPU, ASIC, microprocessor (microcomputer), and DSP, and includes an operation unit, a memory, and an I/O port.

The hybrid ECU 18 is one example of a computer. It acquires accelerator opening information, brake operation information, vehicle speed information, and engine rotational speed information acquired from the engine ECU 11, and controls the clutch 12 by referring to the acquired information. The hybrid ECU 18 issues an instruction to control the electric motor 13 and the inverter 14 to the motor ECU 17, and also issues an instruction to control the engine 10 to the engine ECU 11. For example, the hybrid ECU 18 is composed of a CPU, ASIC, microprocessor (microcomputer), and DSP, and includes a calculation unit, a memory, and an I/O port.

A computer program executed by the hybrid ECU 18 is stored beforehand into a non-volatile memory in the hybrid ECU 18, whereby the computer program can preliminarily be installed to the hybrid ECU 18 that is a computer.

The engine ECU 11, the motor ECU 17, and the hybrid ECU 18 are interconnected with a bus in accordance with a standard such as CAN (Control Area Network).

The wheel 19 is a driving wheel that transmits driving force to a road surface. Although FIG. 1 illustrates only one wheel 19, the hybrid vehicle 1 actually includes plural wheels 19.

Figure 2:
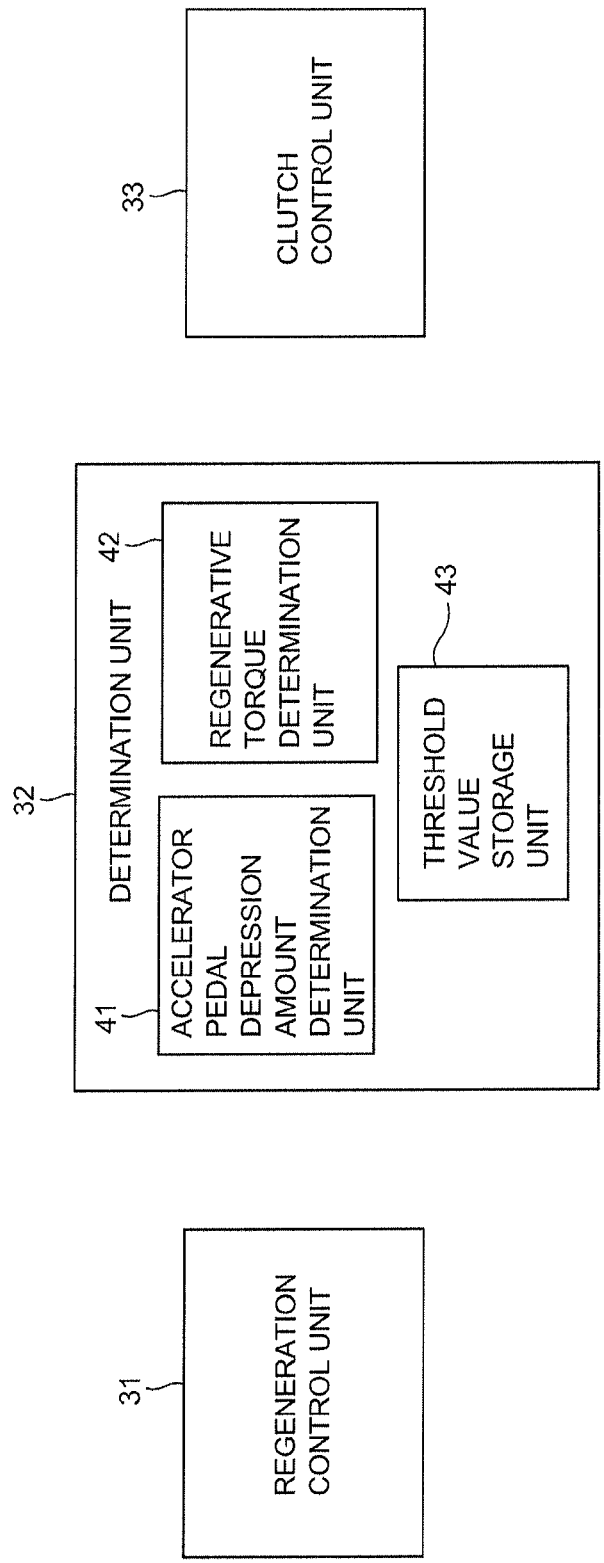
FIG. 2 is a block diagram illustrating an example of a configuration of functions realized by a hybrid ECU 18.

FIG. 2 is a block diagram illustrating an example of a configuration of functions realized in the hybrid ECU 18. Specifically, when the hybrid ECU 18 executes the computer program, a regeneration control unit 31, a determination unit 32, and a clutch control unit 33 can be realized. The regeneration control unit 31 issues an instruction to control the electric motor 13 and the inverter 14 to the motor ECU 17, thereby controlling the operation of the electric power regeneration. The determination unit 32 determines whether a depression amount of the accelerator pedal is equal to or lower than a threshold value 1 set beforehand, or whether regenerative torque is equal to or lower than a threshold value 2 set beforehand.

The determination unit 32 includes an accelerator pedal depression amount determination unit 41, a regenerative torque determination unit 42, and a threshold value storage unit 43. The accelerator pedal depression amount determination unit 41 reads the threshold value 1, which is preliminarily stored, from the threshold value storage unit 43, and compares the depression amount of the accelerator pedal to the threshold value 1, thereby determining whether the depression amount of the accelerator pedal is equal to or lower than the threshold value 1. The regenerative torque determination unit 42 reads the threshold value 2, which is preliminarily stored, from the threshold value storage unit 43, and compares the regenerative torque to the threshold value 2, thereby determining whether the regenerative torque is equal to or lower than the threshold value 2. The threshold value storage unit 43 stores the threshold values 1 and 2 that are determined beforehand. The accelerator pedal depression amount determination unit 41 may hold the threshold value 1 set beforehand as a constant, for example. The regenerative torque determination unit 42 may hold the threshold value 2 set beforehand as a constant, for example.

The clutch control unit 33 controls the clutch in such a manner as engaging the clutch 12 or disengaging the clutch 12 by transmitting a control signal.

Figure 3:
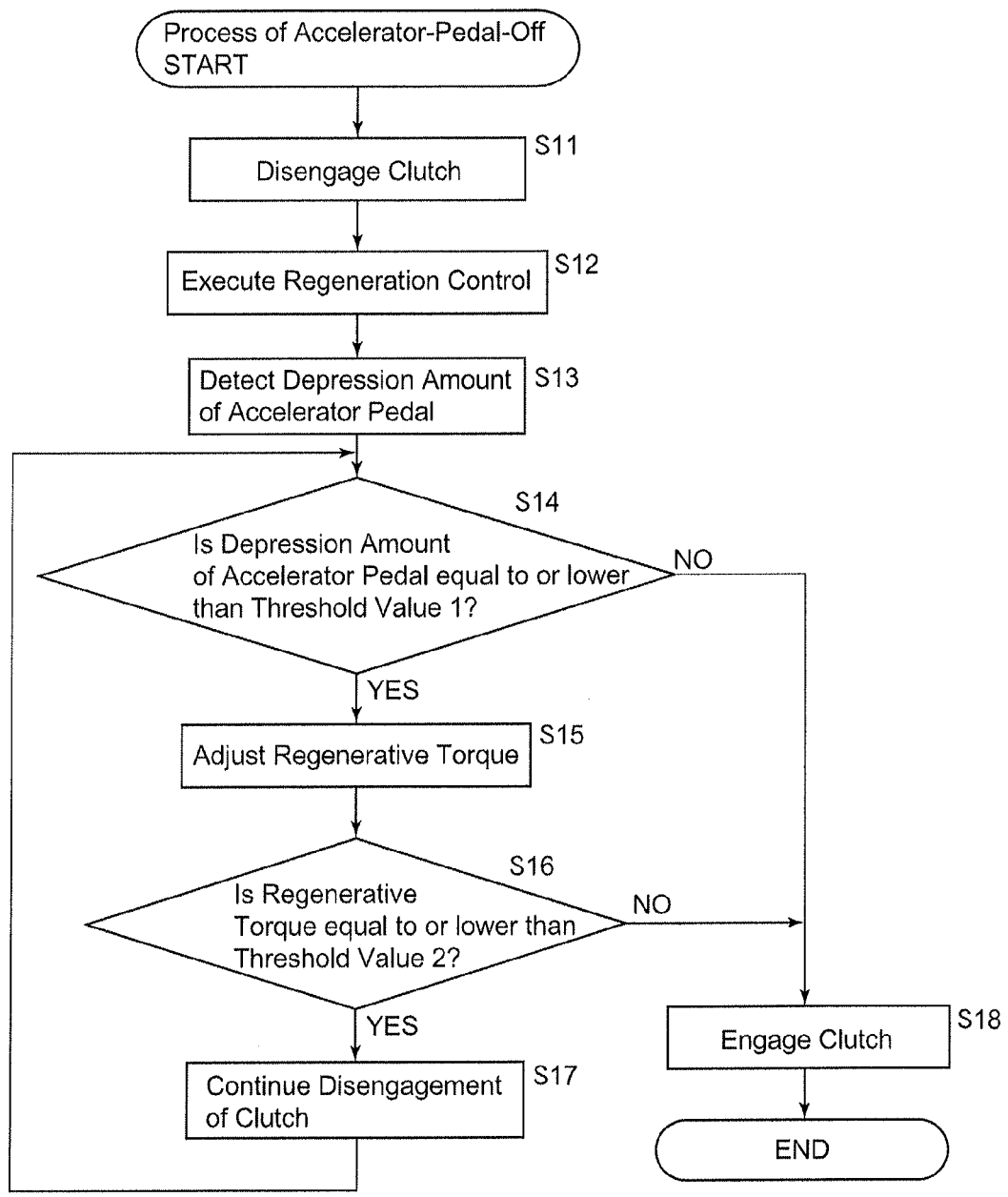
FIG. 3 is a flowchart describing a process of accelerator-pedal-off.

FIG. 3 is a flowchart describing a process of accelerator-pedal-off, the process being executed when the depression amount of the accelerator pedal is completely zero. In step S11, the clutch control unit 33 controls the clutch 12 to disengage the clutch 12 by transmitting the control signal. In step S12, the regeneration control unit 31 issues an instruction to control the electric motor 13 and the inverter 14 to the motor ECU 17 in order to execute the regeneration control for executing the regeneration of electric power.

In step S13, the determination unit 32 acquires the accelerator opening information indicating the depression amount of the accelerator pedal, thereby detecting the depression amount of the accelerator pedal. In step S14, the accelerator pedal depression amount determination unit 41 in the determination unit 32 reads the threshold value 1, which is preliminarily stored, from the threshold value storage unit 43, and compares the depression amount of the accelerator pedal and the threshold value 1, thereby determining whether the depression amount of the accelerator pedal is equal to or lower than the threshold value 1.

For example, it is supposed that the direction of the torque, applied to the shaft (near the electric motor 13) of the transmission 16 or the wheel 19, in which the hybrid vehicle 1 increases its speed is defined as a positive direction, while the direction of the torque in which the hybrid vehicle 1 reduces its speed is defined as a negative direction. In this case, the threshold value 1 can be the depression amount of the accelerator pedal by which the direction of the torque changes to the positive direction from the negative direction. Specifically, in this case, the accelerator pedal depression amount determination unit 41 determines whether the depression amount of the accelerator pedal is equal to or lower than the threshold value 1 that indicates the depression amount requesting 0 acceleration (that means no acceleration and no deceleration) in step S14. For example, when the depression amount of the accelerator pedal in case where the accelerator pedal is fully opened is defined as 100%, the threshold value 1 is defined as 30%, in this case.

The threshold value 1 may be determined based on the rotational speed of the shaft (near the electric motor 13) of the transmission 16. When the rotational speed of the shaft of the transmission 16 and the rotational speed of the engine 10 are equal to each other with the clutch 12 being disengaged, for example, the hybrid vehicle 1 neither increases its speed nor decreases its speed, even if the clutch 12 is engaged in this case. When this situation is expressed by the depression amount of the accelerator pedal, it corresponds to the "depression amount of the accelerator pedal requesting 0 acceleration (no acceleration and no deceleration)" described above. Accordingly, if the rotational speed of the shaft of the transmission 16 is high, the threshold value 1 may be high, and if the rotational speed of the shaft of the transmission 16 is low, the threshold value 1 may be low. As described above, the threshold value 1 may be determined according to the rotational speed of the shaft of the transmission 16.

The accelerator pedal depression amount determination unit 41 may read the threshold value 1 from the threshold value storage unit 43 upon the start, hold the threshold value 1 therein, and compare the threshold value 1 held therein and the depression amount of the accelerator pedal, in order to determine whether the depression amount of the accelerator pedal is equal to or lower than the threshold value 1 set beforehand.

When it is determined in step S14 that the depression amount of the accelerator pedal is equal to or lower than the threshold value 1, which means a driver requests gentler deceleration, not acceleration, the process proceeds to step S15 where the regeneration control unit 31 issues an instruction to control the electric motor 13 and the inverter 14 to the motor ECU 17 in order to control the regenerative torque. Specifically, in this case, the regeneration control unit 31 controls the regenerative torque so as to reduce the regenerative torque according to the detected depression amount of the accelerator pedal, when the accelerator pedal is depressed a little although the depression amount is equal to or lower than the threshold value 1. The regeneration control unit 31 reports the instructed value of the regenerative torque to the determination unit 32.

In step S16, the regenerative torque determination unit 42 in the determination unit 32 reads the threshold value 2, which is preliminarily stored, from the threshold value storage unit 43, and compares the regenerative torque to the threshold value 2, thereby determining whether the regenerative torque is equal to or lower than the threshold value 2. The regenerative torque determination unit 42 may read the threshold value 2 from the threshold value storage unit 43 upon the start, hold the threshold value 2 therein, and compare the threshold value 2 held therein and the regenerative torque, in order to determine whether the regenerative torque is equal to or lower than the threshold value 2 set beforehand.

When it is determined in step S16 that the regenerative torque is equal to or lower than the threshold value 2, the process proceeds to step S17 where the clutch control unit 33 controls the clutch 12 to continue the disengagement state of the clutch 12 by transmitting the control signal. After step S17, the process returns to step S14, and the process is repeated.

When it is determined in step S14 that the depression amount of the accelerator pedal exceeds the threshold value 1, which means the driver requests to increase the speed of the vehicle, the process proceeds to step S18 where the clutch control unit 33 controls the clutch 12 to engage the clutch 12 by transmitting the control signal. Then, the process of accelerator-pedal-off is ended. In this case, the hybrid vehicle 1 increases its speed by power from the engine 10, in this case.

When it is determined in step S16 that the regenerative torque exceeds the threshold value 2, i.e., when the amount of regeneration decreases by which the torque generated by the electric motor 13 becomes larger than the regenerative torque, even during the deceleration, the process proceeds to step S18 where the clutch control unit 33 controls the clutch 12 to engage the clutch 12 by transmitting the control signal. Then, the process of accelerator-pedal-off is ended.

Figure 4:
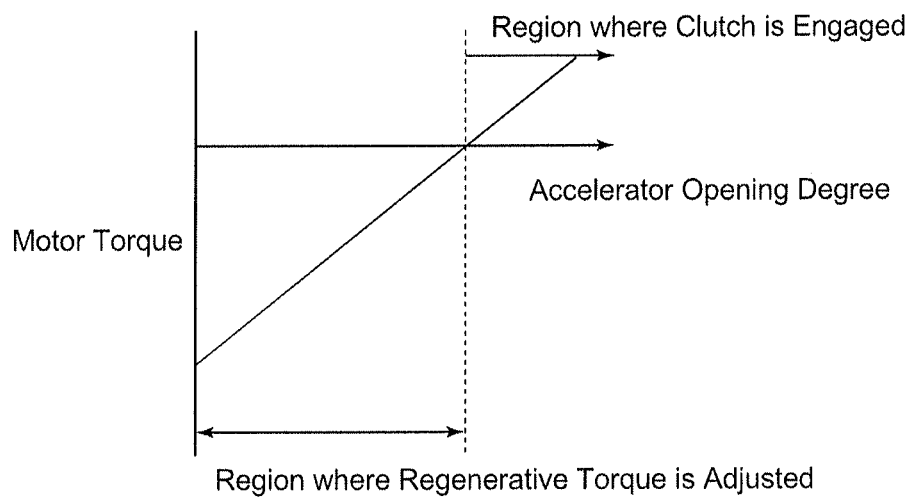
FIG. 4 is a view illustrating a relationship between a depression amount of the accelerator pedal and regenerative torque.

FIG. 4 is a view illustrating a relationship between the depression amount of the accelerator pedal and the regenerative torque, when the rotational speed of the shaft (near the electric motor 13) of the transmission 16 is made constant.

For example, when the threshold value 1 is set as 30%, the regenerative torque is controlled to be reduced in accordance with the depression amount of the accelerator pedal within the range where the depression amount of the accelerator pedal (i.e., the accelerator opening degree, in this case) is not more than 30%. On the other hand, when the depression amount of the accelerator pedal exceeds 30%, the clutch 12 is engaged.

Figure 5:
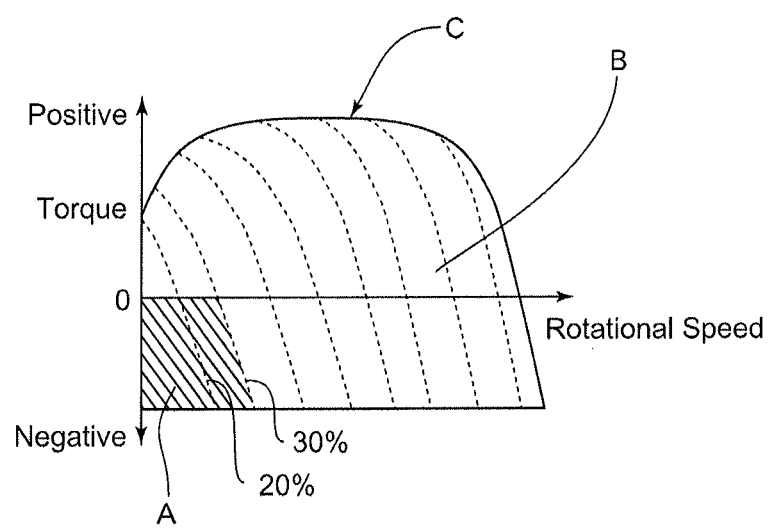
FIG. 5 is a view illustrating a relationship between a depression amount of the accelerator pedal and regenerative torque.

FIG. 5 is a view illustrating a relationship between the depression amount of the accelerator pedal and the regenerative torque, when the rotational speed of the shaft (near the electric motor 13) of the transmission 16 is changed. In FIG. 5, a vertical axis indicates torque applied to the shaft (near the electric motor 13) of the transmission 16, and a horizontal axis indicates the rotational speed of the shaft (near the electric motor 13) of the transmission 16. In FIG. 5, a dotted line indicates the relationship between the torque and the rotational speed, when the depression amount of the accelerator pedal (accelerator opening degree) is constant.

As illustrated in FIG. 5, in a region A where the accelerator opening degree is not more than 30%, negative torque (torque for deceleration) is required to be generated, and the rotational speed is low, the disengagement of the clutch is continued, and the regenerative torque is adjusted to apply negative torque (torque for deceleration) to the shaft of the transmission 16.

On the other hand, as illustrated in FIG. 5, in a region B where positive torque (torque for acceleration) is required to be generated, or the rotational speed is high, the clutch is engaged, by which the torque generated by the engine 10 and the torque generated by the electric motor 13 are applied to the shaft of the transmission 16.

As described above, it can be predicted that the driver requests to increase speed, or the driver does not request to increase speed, but to gently reduce speed, according to the depression amount of the accelerator pedal.

In FIG. 5, a solid line C indicates maximum torque.

As described above, the threshold value is set for the operation amount of the accelerator pedal during the regeneration with the clutch being disengaged, and when the accelerator opening degree is not more than the threshold value, the clutch is not engaged, and the regenerative torque is reduced. Thus, the speed of the vehicle increases.

For example, when the driver slightly depresses the accelerator pedal, the operation corresponding to the driver's operation can be attained only by reducing the regenerative torque without engaging the clutch 12. On the other hand, when the driver greatly depresses the accelerator pedal, the clutch 12 is engaged for acceleration.

Since a hysteresis is formed for the condition of engaging the clutch 12 by the operation on the accelerator pedal, a troublesome engagement and disengagement of the clutch 12 can be prevented. Accordingly, deterioration in drivability and fuel economy can be depressed.

As described above, the present invention can prevent the driver from feeling a sense of discomfort upon driving.

The idling state of the engine 10 can be continued, whereby fuel economy can be enhanced. Specifically, when the clutch 12 is frequently engaged and disengaged, the engine 10 has to be brought into an idle-up state from the idling state in each case, which deteriorates fuel economy. The present invention can prevent this situation.

It is described that the engine 10 is the internal combustion engine. However, the engine 10 may be a thermal engine including an external combustion engine.

The computer program executed by the hybrid ECU 18 is installed beforehand in the hybrid ECU 18 in the above description. However, a removable media on which the computer program is stored (that stores the program) may be attached to a drive not illustrated, and the computer program read from the removable media may be stored on the non-volatile memory in the hybrid ECU 18, or the computer program sent via a wired or wireless transfer medium may be received by a communication unit not illustrated, and stored in the non-volatile memory in the hybrid ECU 18, whereby the computer program may be installed to the hybrid ECU 18 that is a computer.

The respective ECUs may be realized by an ECU having some of these functions or all of these functions. Alternatively, an ECU having classified functions of each ECU may newly be provided.

The computer program executed by the computer may be a computer program by which the process is executed in a time-series manner according to the order described in the present specification, or may be a computer program by which the process is executed simultaneously, or on a necessary timing when called.

The embodiment of the present invention is not limited to the above-mentioned embodiment, and various modifications are possible without departing from the gist of the present invention.

The invention claimed is:

1. A vehicle that is driven by an internal combustion engine and an electric motor, a shaft of the internal combustion engine and a shaft of the electric motor for transmitting power being connected by a clutch that transmits power or cuts the transmission of power, and that regenerates electric power by the electric motor when reducing its speed, the vehicle includes a device comprising:
    a determination unit that determines, after the clutch is disengaged, whether a depression amount of an accelerator pedal is equal to or lower than a first threshold value set beforehand, to regenerate electric power; and
    a first control unit that controls the engagement or the disengagement of the clutch in such a manner as:
    keeping the disengagement of the clutch when the depression amount of the accelerator pedal is determined to be equal to or lower than the first threshold value, and
    engaging the clutch when the depression amount of the accelerator pedal is determined to exceed the first threshold value.

2. The vehicle according to claim 1, wherein the determination unit determines whether the depression amount of the accelerator pedal is equal to or lower than the first threshold value indicating the depression amount that requests no acceleration.

3. The vehicle according to claim 1, further comprising
    a second control unit that controls torque generated by regeneration of electric power by the electric motor, wherein
    the determination unit determines whether the torque is equal to or lower than a second threshold value set beforehand, and
    the first control unit controls the engagement or the disengagement of the clutch in such a manner as keeping the disengagement of the clutch, when the depression amount of the accelerator pedal is determined to be equal to or lower than the first threshold value, and the torque is determined to be equal to or lower than the second threshold value, and engaging the clutch when the depression amount of the accelerator pedal is determined to exceed the first threshold value, or the torque is determined to exceed the second threshold value.

4. A control method for a vehicle that is driven by an internal combustion engine and an electric motor, a shaft of the internal combustion engine and a shaft of the electric motor for transmitting power being connected by a clutch that transmits power or cuts the transmission of power, and that regenerates electric power by the electric motor when reducing its speed, the method comprising:
    a determining step of determining, by a determination processor, after the clutch is disengaged, whether a depression amount of an accelerator pedal is equal to or lower than a threshold value set beforehand, to regenerate electric power; and
    a control step of controlling, by a control processor, the engagement or the disengagement of the clutch in such a manner as:
    keeping the disengagement of the clutch when the depression amount of the accelerator pedal is determined to be equal to or lower than the first threshold value, and
    engaging the clutch when the depression amount of the accelerator pedal is determined to exceed the first threshold value.

5. A non-transitory computer readable medium containing program instructions executed by a controller that causes a computer which controls a vehicle, which is driven by an internal combustion engine and an electric motor, a shaft of the internal combustion engine and a shaft of the electric motor for transmitting power being connected by a clutch that transmits power or cuts the transmission of power, and which regenerates electric power by the electric motor when reducing its speed, to execute:
    a determining step of determining, after the clutch is disengaged, whether a depression amount of an accelerator pedal is equal to or lower than a threshold value set beforehand, to regenerate electric power; and
    a control step of controlling the engagement or the disengagement of the clutch in such a manner as:

keeping the disengagement of the clutch when the depression amount of the accelerator pedal is determined to be equal to or lower than the first threshold value, and
engaging the clutch when the depression amount of the accelerator pedal is determined to exceed the first threshold value.

* * * * *